United States Patent [19]
Grant et al.

[11] Patent Number: 5,592,472
[45] Date of Patent: Jan. 7, 1997

[54] HIGH PERFORMANCE PATH ALLOCATION SYSTEM AND METHOD FOR A FIBER OPTIC SWITCH FOR A FIBER OPTIC NETWORK

[75] Inventors: Robert Grant; Bent Stoevhase; Robin Purohit, all of Toronto; Gregory T. Sullivan, Brampton; David Book, Thornhill, all of Canada

[73] Assignee: Hewlett-Packard Company, Palo Alto, Calif.

[21] Appl. No.: 330,169

[22] Filed: Oct. 27, 1994

[51] Int. Cl.$^6$ ............................ H04J 14/08; H04L 12/56
[52] U.S. Cl. ................. 370/351; 370/412; 370/462; 385/16; 359/139; 359/152
[58] Field of Search ................. 370/60, 60.1, 53, 370/54, 58.1, 58.2, 94.1, 58.3, 94.2; 385/13, 16, 18, 21; 359/109, 118, 119, 128, 137, 139, 152

[56] References Cited

U.S. PATENT DOCUMENTS

| | | | |
|---|---|---|---|
| 5,067,123 | 11/1991 | Hyodo et al. | 370/60 |
| 5,126,999 | 6/1992 | Munter et al. | 370/60 |
| 5,130,975 | 7/1992 | Akata | 370/60 |
| 5,185,736 | 2/1993 | Tyrell et al. | 370/55 |
| 5,224,093 | 6/1993 | Denzel et al. | 370/60 |
| 5,255,266 | 10/1993 | Watanabe et al. | 370/60.1 |
| 5,268,900 | 12/1993 | Hluchyj et al. | 370/94.1 |
| 5,278,828 | 1/1994 | Chao | 370/60 |
| 5,291,481 | 3/1994 | Doshi et al. | 370/60 |
| 5,357,506 | 10/1994 | Sugawara | 370/60 |
| 5,365,522 | 11/1994 | Peeters | 370/60 |
| 5,384,773 | 1/1995 | Olnowich et al. | 370/60.1 |
| 5,390,184 | 2/1995 | Morris | 370/94.2 |
| 5,418,779 | 5/1995 | Yemini et al. | 370/54 |
| 5,436,894 | 7/1995 | Wallmeier et al. | 370/60.1 |
| 5,459,726 | 10/1995 | Michet et al. | 370/60 |
| 5,490,007 | 2/1996 | Bennet et al. | 359/139 |

OTHER PUBLICATIONS

Kumar Malavalli & Bent Stoevhase; "Distributed Computing With Fibre Channel Fabric"; Canstar (A Division of Alcatel Canada Wire, Inc.), 3900 Victoria Park Ave., North York, Ontario, Canada; Publication Date: Feb. 24, 1992.

*Primary Examiner*—Alpus H. Hsu
*Assistant Examiner*—Seema S. Rao
*Attorney, Agent, or Firm*—Richard F. Schuette

[57] ABSTRACT

A fiber optic switch interconnects fiber optic channels so that a fiber optic network can be implemented. Channel modules provide ports (p1–pi) for connection of the fiber optic channels. Each channel module has a receive memory for temporarily storing incoming data frames from the fiber optic channels associated therewith. A switch module having a data distribution network interconnects each of the channel modules and permits ultimate connection of a source channel to a destination channel. A path allocation system, which controls the switch module, allocates the data paths between the channels. The path allocation system has a scheduler which maintains a destination queue ($Q_{p1}$–$Q_{pi}$) for each of the channels, a sentry which determines when a new data frame is ready to be routed, and an arbitrator which arbitrates port availability and which grants transfer requests proposed by the scheduler.

10 Claims, 4 Drawing Sheets

HIGH PERFORMANCE PATH ALLOCATION SYSTEM AND METHOD FOR A FIBER OPTIC SWITCH FOR A FIBER OPTIC NETWORK

FIELD OF THE INVENTION

The present invention generally relates to data communications and fiber optic networks, and more particularly, to a path allocation system and method for allocating data paths between fiber optic channels through a fiber optic switch for a fiber optic network, while providing for high performance and flexibility and while minimizing hardware requirements.

BACKGROUND OF THE INVENTION

A data communications network generally includes a group of interconnected communication channels which provides intercommunication among a combination of elements or devices, for instance, computers, peripherals, etc. Historically, networks have been constructed by utilizing communication channels formed from coaxial cables and/or twisted pair cable configurations and interconnected via a suitable interface, or switching module.

Fiber optic cables are increasingly being used in the network industry, instead of coaxial cables and twisted pairs, because of their much broader bandwidth, better propagation properties, and other optimal transmission characteristics. Recently, the Fibre Channel protocol was developed and adopted as the American National Standard For Information Systems (ANSI). The Fibre Channel industry standard is described in detail in, for example, *Fibre Channel Physical And Signalling Interface*, Rev. 4.2, American National Standard For Information Systems (ANSI) (1993). The Fibre Channel industry standard provides for much higher performance and greater flexibility than previous industry standards by allowing for variable-length data frames, or packets, to be communicated through fiber optic networks which comply with the standard.

A variable-length frame 11 is illustrated in FIG. 1. The variable-length frame 11 comprises a 4-byte start-of-frame (SOF) indicator 12, which is a particular binary sequence indicative of the beginning of the frame 11. The SOF indicator 12 is followed by a 24-byte header 14, which generally specifies, among other things, the frame source address and the destination address as well as whether the frame 11 is either control information or actual data. The header 14 is followed by a field of variable-length data 16. The length of the data 16 is 0 to 2112 bytes. The data 16 is followed successively by a 4-byte CRC (cyclical redundancy check) code 17 for error detection and/or correction, and by a 4 byte end-of-frame (EOF) indicator 18. The frame 11 of FIG. 1 is much more flexible than a fixed frame and provides for higher performance by accommodating the specific needs of specific applications.

The Fibre Channel industry standard also provides for several different types of data transfers. A class 1 transfer requires circuit switching, i.e., a reserved data path through the network switch, and generally involves the transfer of more than one data frame, oftentimes numerous data frames, between the network elements. In contrast, a class 2 transfer requires allocation of a path through the network switch for each transfer of a single frame from one network element to another.

To date, fiber optic switches for implementing networks in accordance with the Fibre Channel industry standard are in a state of infancy. One such fiber optic switch known in the industry is ANCOR, which is manufactured by and made commercially available from IBM, U.S.A. However, the performance of the ANCOR switch is less than optimal for many applications and can be improved significantly. Moreover, the ANCOR switch is inflexible in that it provides for primarily circuit switching for class 1 transfers and is very limited with respect to frame switching for class 2 transfers.

Thus, a heretofore unaddressed need exists in the industry for new and improved systems for implementing the Fibre Channel industry standard for fiber optic networks with much higher performance than presently existing systems. Specifically, there is a significant need for a path allocation system and method for a fiber optic switch which can provide for both circuit switching and frame switching with high performance, while minimizing hardware requirements and exhibiting high flexibility for a variety of applications.

SUMMARY OF THE INVENTION

An object of the present invention is to overcome the deficiencies and inadequacies of the prior art as noted above and as generally known in the industry.

Another object of the present invention is to provide a high performance path allocation system and method for a fiber optic switch of a fiber optic network.

Another object of the present invention is to provide a flexible path allocation system and method for a fiber optic switch which accommodate both efficient circuit switching and frame switching for class 1 and class 2 transfers, respectively, in accordance with the Fibre Channel industry standard.

Another object of the present invention is to provide a path allocation system and method for a fiber optic switch with minimum hardware requirements.

Briefly described, the present invention provides for a path allocation system and method for effectuating high performance data transfer through a fiber optic switch in a fiber optic network. The novel path allocation system is constructed as follows. A plurality of ports are associated respectively with a plurality of fiber optic channels of the network. Each of the ports has a corresponding port intelligence mechanism, which comprises a transmitter and a receiver.

A memory interface system is associated with a plurality of the port intelligence mechanisms (or ports) for temporarily storing incoming new data frames from source ports for class 2 data transfers (frame switching). The memory interface system has bypass paths for class 1 data transfers (circuit switching).

A switch module comprises several distribution networks, including a control distribution network (CDN), a main distribution network (MDN) for data, and an intermix distribution network (IDN) for data. The switch module can selectively interconnect data paths between the memory interface systems.

A sentry communicates with the memory interface systems through the switch module. It determines when a new data frame has been received by the memory interface systems, and it solicits path data from the memory interface systems regarding new data frames.

A scheduler maintains a destination queue corresponding with each of the ports. The scheduler receives path data from the sentry after the sentry recognizes a new data frame. The path data includes, e.g., a source port indicator, a memory address, and a destination port indicator. The scheduler places path data within a destination queue corresponding with the appropriate destination port and retrieves path data from each particular destination queue based upon an order defined by the destination queue. The scheduler services the destination queues based upon an order (sequential order in the preferred embodiment) defined by glue logic.

The glue logic interacts with the port intelligence mechanisms to determine when a transmitter associated with each of the ports is busy and available (i.e., ready to transmit data to the channel and ready to receive data from the switch). Based upon the foregoing inquiries, the glue logic identifies a next destination port to be serviced and informs the scheduler of such. The scheduler then accesses the destination queue corresponding to the next destination port.

An arbitrator ultimately controls data transfers through the switch module and communicates with the scheduler and the port intelligence mechanisms. The arbitrator determines when the ports are available or are busy servicing other data transfer requests. If available, the arbitrator allows communication (class 1 transfer or class 2 transfer) of the data between ports via the main distribution network or the intermix distribution network.

In addition to achieving all the objects as denoted previously, the present invention also has many other advantages, a few of which are indicated hereafter.

An advantage of the present invention is that the path allocation system provides for centralized control of paths, which minimizes hardware requirements and permits easy access to transfer statistics.

Another advantage of the present invention is that the centralized control of paths permits use of high level optimization algorithms which can be easily and efficiently interfaced with the centralized control.

Another advantage of the present invention is that the centralized control does not require time to resolve port resource or path contentions, as is the case with distributed path allocation systems.

Another advantage of the present invention is that the path allocation system is simple in design, inexpensive to implement on a mass commercial scale, and reliable as well as efficient in operation.

Other objects, features, and advantages of the present invention will become apparent to one of skill in the art upon examination of the following drawings and detailed description. All such additional objects, features, and advantages are intended to be incorporated herein.

BRIEF DESCRIPTION OF THE DRAWINGS

The present invention can be better understood with reference to the following drawings. The drawings are not necessarily to scale, emphasis instead being placed upon clearly illustrating principles of the present invention.

DETAILED DESCRIPTION OF THE PREFERRED EMBODIMENT

Figure 2:
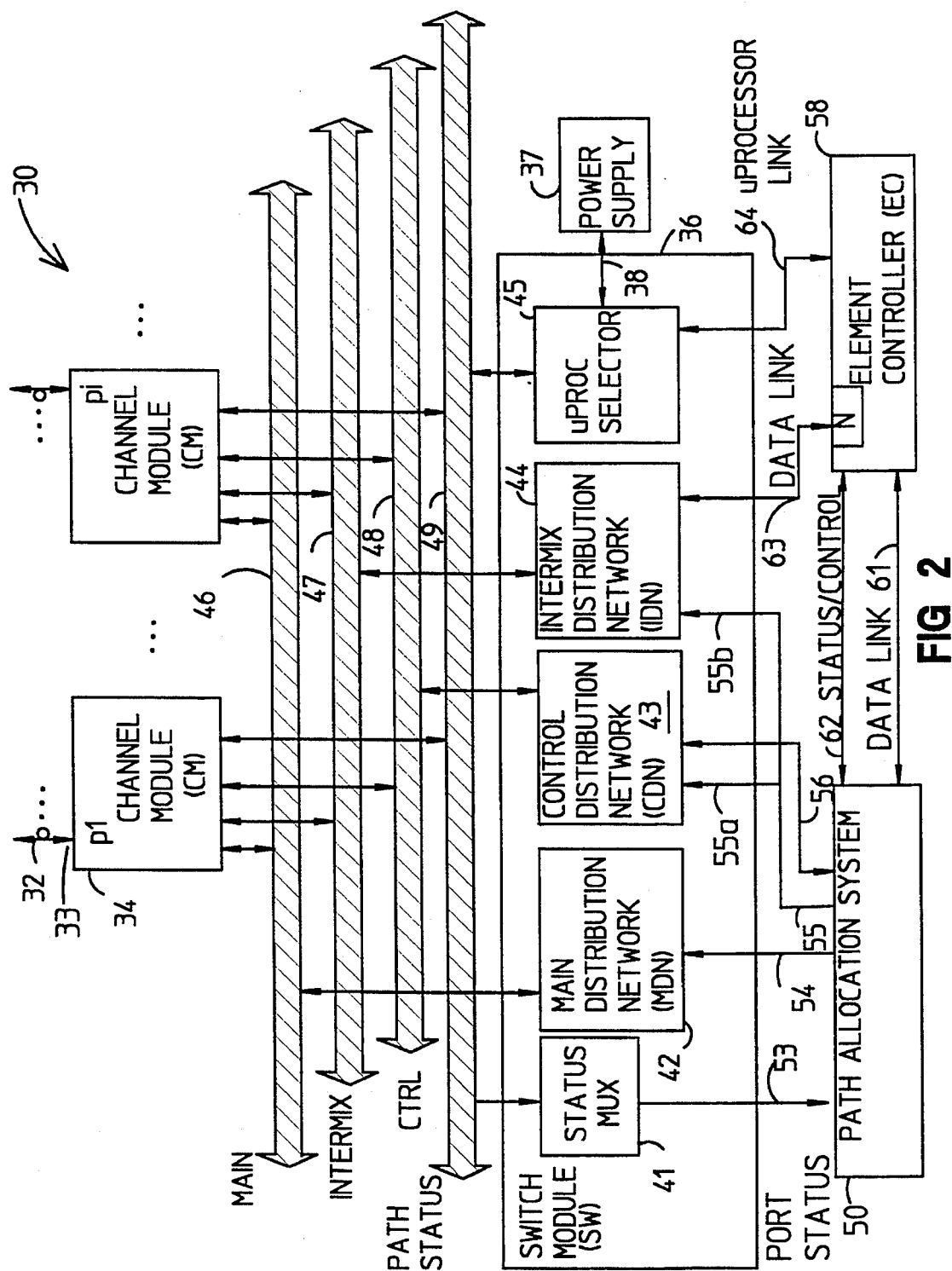
FIG. 2 is a schematic circuit diagram of a high performance fiber optic switch for a fiber optic network.

With reference now to the drawings wherein like reference numerals designate corresponding parts throughout the several views, a schematic circuit diagram of a fiber optic switch 30 is shown in FIG. 2. The fiber optic switch 30 enables implementation of a fiber optic network by permitting selective interconnection of a plurality of fiber optic channels 32. The fiber optic switch 30 is a very flexible system, permits both circuit and frame switching for class 1 and 2 data transfers, respectively, in accordance with the Fibre Channel industry standard, and is a much higher performance system than other conventional fiber optic switches.

In architecture, the fiber optic switch 30 has a plurality of channel modules 34 to which the fiber optic channels 32 are connected via respective ports (p1-pi) 33. Each channel module 34 is connected to one or more of the fiber optic channels 32. Each channel module 34 provides port intelligence for data communication with the channels, as well as bypasses for class 1 data transfers and receive memory for temporarily storing data frames for class 2 data transfers, as will be further described in detail later in this document. The channel modules 34 are connected to a switch module 36, which receives and distributes electrical energy from a power supply 37. In the preferred embodiment, the switch module 36 is implemented as part of a back plane and has disposed thereon a number of functional interface elements.

The switch module 36 has a status multiplexer (MUX) 41 which is configured to receive status signals from the channel modules 34 concerning the ports 33 and associated circuitry. The status signals include at least the following: a "new frame arrived" signal, which indicates when a new frame has been received by a receive memory 84 (FIG. 3) associated with the channel module 34; a receiver ready, or "rxready" signal, which indicates when data received from a port 33 is ready and not ready to be sent through the switch 30 from the receive memory 84 (FIG. 3); an "intermix bus ready" signal, which indicates when the IDN 44 is ready (not being used) and not ready (currently being used) to transfer data; a "port active" signal, which indicates when a port intelligence mechanism 73 (FIG. 3) associated with a port 33 is active/inactive; a "transmitter ready" signal, which indicates when a transmit memory 86 (FIG. 3) associated with a port 33 is ready and not ready to receive data (destined for a destination port 33) from the switch 30; an "intermix ready" signal, which indicates when the IDN 44 is ready and not ready to perform an intermix transfer; and a "transfer status ready," or "xfer ready," signal, which indicates when status information is ready and not ready to be transferred to the path allocation system 50 from the associated status/control logic 85 (FIG. 3) of a channel module 34.

Referring again to FIG. 2, a main distribution network (MDN) 42 selectively interconnects the data paths of the channels 32. A control distribution network (CDN) 43 controls the MDN 42 and communicates control signals to the various channel modules 34. An intermix distribution network (IDN) 44 selectively interconnects intermix paths between channel modules 34. Intermix paths are a set of alternate data paths which are separate from those data paths associated with the MDN 42 and which can permit data flow between selected channels 32 while data paths of the MDN 42 are in use. Finally, a processor selector 45 can optionally be provided as part of an auxiliary system for interconnecting processors and controllers distributed throughout the fiber optic switch 30.

A path allocation system 50 is connected to the switch module 36 and, particularly, to the status multiplexer the MDN 42, the CDN 43, and the IDN 44. The path allocation system 50 generally allocates data interconnect paths through the switch module 36 and between fiber optic ports 33 and determines the priority of the connections. The path allocation system 50 is a significant element of the present invention and because of its design, results in very desirable performance attributes with minimum hardware requirements, as will be further described in detail later in this document.

Also optionally connected to the switch module 36 is an element controller (EC) 58. The element controller 58 essentially provides servers, for example, a name server, a time server, etc. for the fiber optic switch 30. The element controller 58 has a data link 61 with the path allocation system 50 for communicating server information and a status/control connection 62 for exchanging status/control signals with the path allocation system 50. The element controller 58 also exchanges initialization and/or configuration information with the CMs 34 and the microprocessor selector 45 via respective connection 64.

Figure 3:
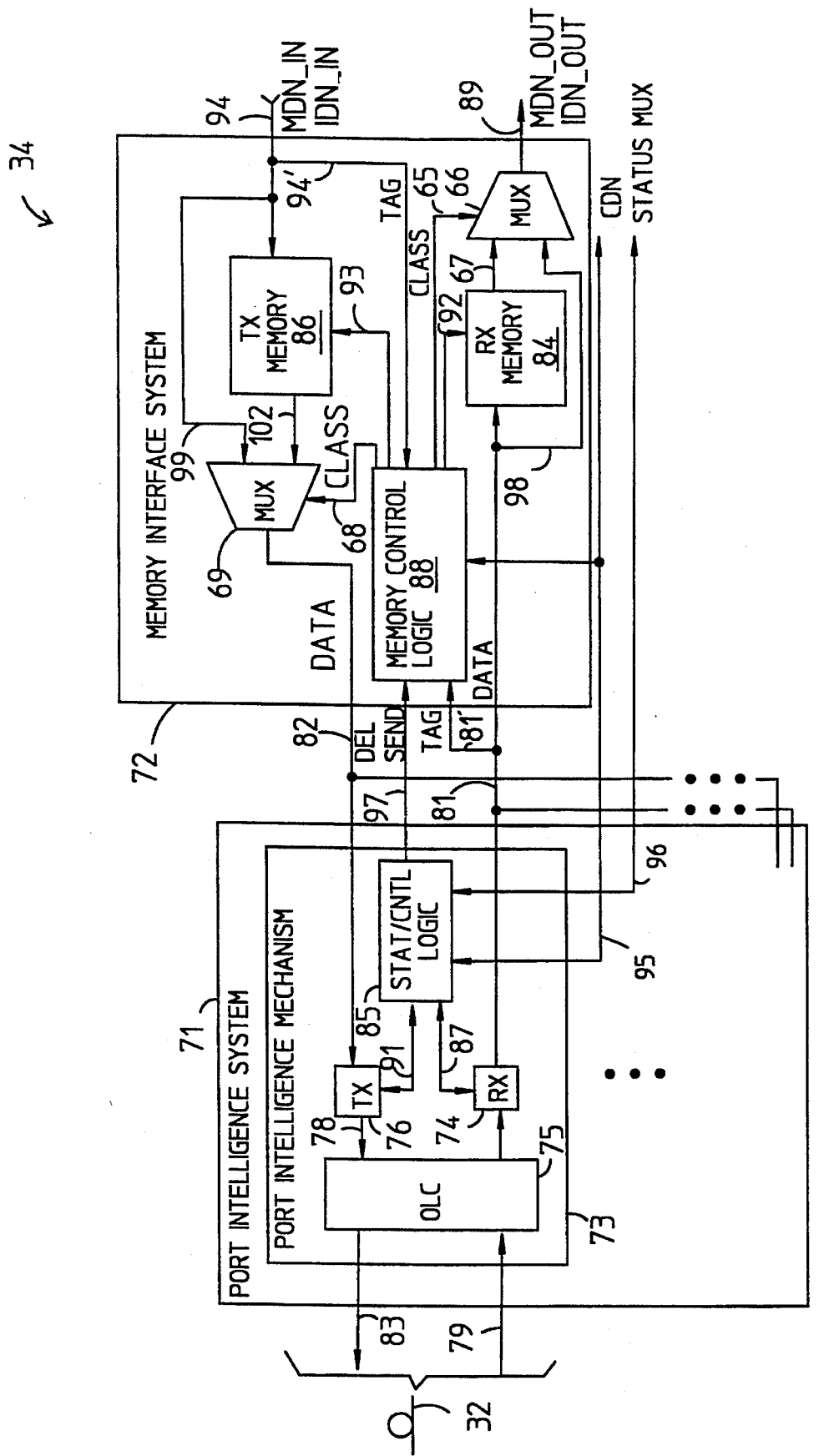
FIG. 3 is a schematic circuit diagram of a channel module (CM) within the fiber optic switch of FIG. 2.

Preferably, each of the channel modules 34 is constructed as indicated in the schematic circuit diagram of FIG. 3. With reference to FIG. 3, each channel module 34 comprises a port intelligence system 71 connected to a memory interface system 72. In the preferred embodiments the port intelligence system 71 has one or more port intelligence mechanisms 73. One port intelligence mechanism 73 is allocated to each fiber optic channel 32. Each port intelligence mechanism 73 has a receiver (RX) 74, a transmitter (TX) 76, an optical link card (OLC) 75, and a status/control (STAT/ CNTL) logic 85. The receiver 74 and the transmitter 76 are adapted to receive and transmit data, respectively, through their corresponding input and output fibers 79, 83 (shown collectively in FIG. 2 as channel 32) in accordance with the Fibre Channel industry standard protocol and at the channel's particular bit rate.

The OLC 75 is utilized to directly interface the port intelligence mechanism 73 to the fiber optic channel 32. The OLC 75 provides an optical-to-electrical conversion as well as a serial-to-parallel conversion between the input fiber 79 of the channel 32 and the receiver 74. Furthermore, the OLC 75 provides an electrical-to-optical conversion as well as a parallel-to-serial conversion between the output fiber 83 of the channel 32 and the transmitter 76. The OLC 75 can be any suitable conventional optical link card, for example but not limited to, a model OLC266 manufactured by and commercially available from IBM Corp., U.S.A., or a model MIM266 manufactured by and commercially available from ELDEC, Inc., U.S.A.

The status/control logic 85 monitors and controls both the receiver 74 and the transmitter 76, as indicated by corresponding bidirectional control connections 87, 91. Further, the status/control logic 85 exchanges control signals on control connection 95 with the CDN 43 (FIG. 2), provides status signals on connection 96 to the status MUX 41 (FIG. 2) indicative of, e.g., whether the corresponding port 33 is available or busy, and forwards control signals to the memory interface system 72 via connection 97. The status/ control logic 85 further recognizes when a new frame is received by the receiver 74 and determines the transfer class (either 1 or 2) as well as the length of data pertaining to each new frame. It should be noted that a frame could have no data, as for example, in the case of an SOFc1 frame, which is initially passed through the switch 30 for setting the switch 30 up to reserve a bidirectional path for a class 1 data transfer.

The memory interface system 72 is connected in series, or cascaded, with the port intelligence system 71, and particularly, with each port intelligence mechanism 73 contained therein. The memory interface system 72 generally provides class 1 bypass data connections 98, 99 for class 1 data transfers and provides temporary storage for class 2 data transfers. For data storage relative to class 2 data transfers, the memory interface system 72 has a receive memory (RX MEMORY) 84 for source data, a transmit memory (TX MEMORY) 86 for destination data, and memory control logic 88 for controlling the receive and transmit memories 84, 86. The receive memory 84 and the transmit memory 86 may be partitioned into a number of individual buffers or memory blocks, if desired.

Figure 1:
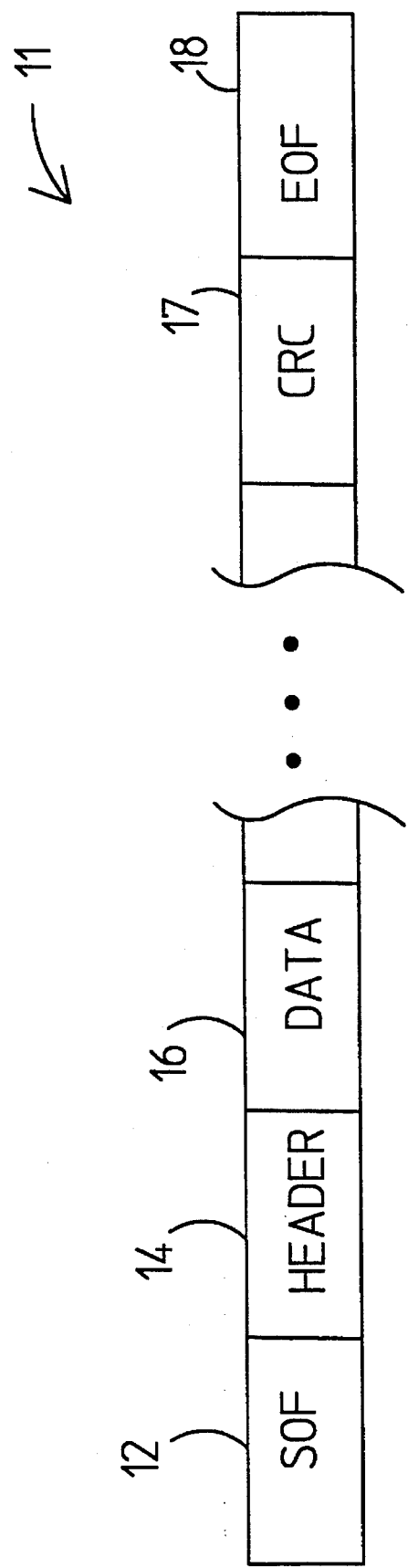
FIG. 1 is a schematic diagram of a variable-length frame communicated through a fiber optic switch of a fiber optic network in accordance with the Fibre Channel industry standard.

When incoming class 1 source data is received by the memory interface system 72 from the port intelligence system 71, the source data bypasses the receive memory 84 via successively bypass data connection 98, MUX 66, and data connection 89. The data connection 89 introduces the source data to the data buses of the MDN 42 or the IDN 44 of the switch module 36. The memory control logic 88 receives a tag 81' from the receiver 74 indicative of either a class 1 or class 2 data transfer and controls the MUX 66 accordingly on class control connection 65. The receiver 74 generates the tag 81' based upon the header 14 (FIG. 1) on the incoming data. In the preferred embodiment, two-bit tags are used. A tag "00" indicates nonuse. A tag "01" indicates data. A tag "10" indicates either SOF or EOF for a class 1 data transfer. A tag "11" indicates either SOF or EOF for a class 2 data transfer.

When incoming class 2 source data is received by the memory interface system 72 (as well as an SOFc1 frame), as is determined by the memory control logic 88 via tag 81', the receive memory 84 reads and stores the source data from the receiver 74 via data connection 81 under the control of the memory control logic 88. Moreover, when the timing is appropriate, the receive memory 84 writes data to the data buses of the MDN 42 or the IDN 44 of the switch module 36 via data connection 67, MUX 66, and data connection 89 under the control of the control logic 88. In order to transfer data from the receive memory 84 to the data buses, the CDN 43 (FIG. 2) communicates a send control signal 95 to the status/control logic 85, and the status/control logic 85 in turn forwards a send signal via control connection 97 to the memory control logic 88. The send signal from the status/ control logic 85 designates the length of the data frame to be sent. Based upon the send signal, the memory control logic 88 controls the receive memory 84 via control connection 92 and controls the MUX 66 with class control connection 65 so that the MUX 66 communicates data from the receive memory 84 to the data connection 89. If desired, the CDN 43 can also delete frames within the receive memory 84 by sending a delete signal (del) to the status/control logic 85, which in turn forwards the delete command to the memory control logic 88 via control connection 97.

Destination data intended for a destination port 33 from the data buses of the MDN 42 or the IDN 44 is made available to the transmit memory 86, as indicated by data connection 94, and the MUX 69, as indicated by the bypass data connection 99. A two-bit tag on tag connection 94', similar to the two-bit tag on tag connection 81', informs the memory control logic 88 when the destination data corresponds to either a class 1 data transfer or a class 2 data transfer. When class 1 destination data is received, the memory control logic 88 controls the MUX 69 via control connection 68 so that the MUX 69 channels the destination data directly to the transmitter 76 of the appropriate port intelligence mechanism 73 via data connection 82, thereby effectively bypassing the transmit memory 86. In contrast, when class 2 destination data is received by the memory interface system 72, the memory control logic 88 controls the transmit memory 86 to store the incoming destination data via data connection 94. When timing is appropriate, the destination data is then ultimately forwarded to the transmitter 76 of the appropriate port intelligence mechanism 73 via successively data connection 102, MUX 69, and data connection 82, under the control of the memory control logic 88.

Figure 4:
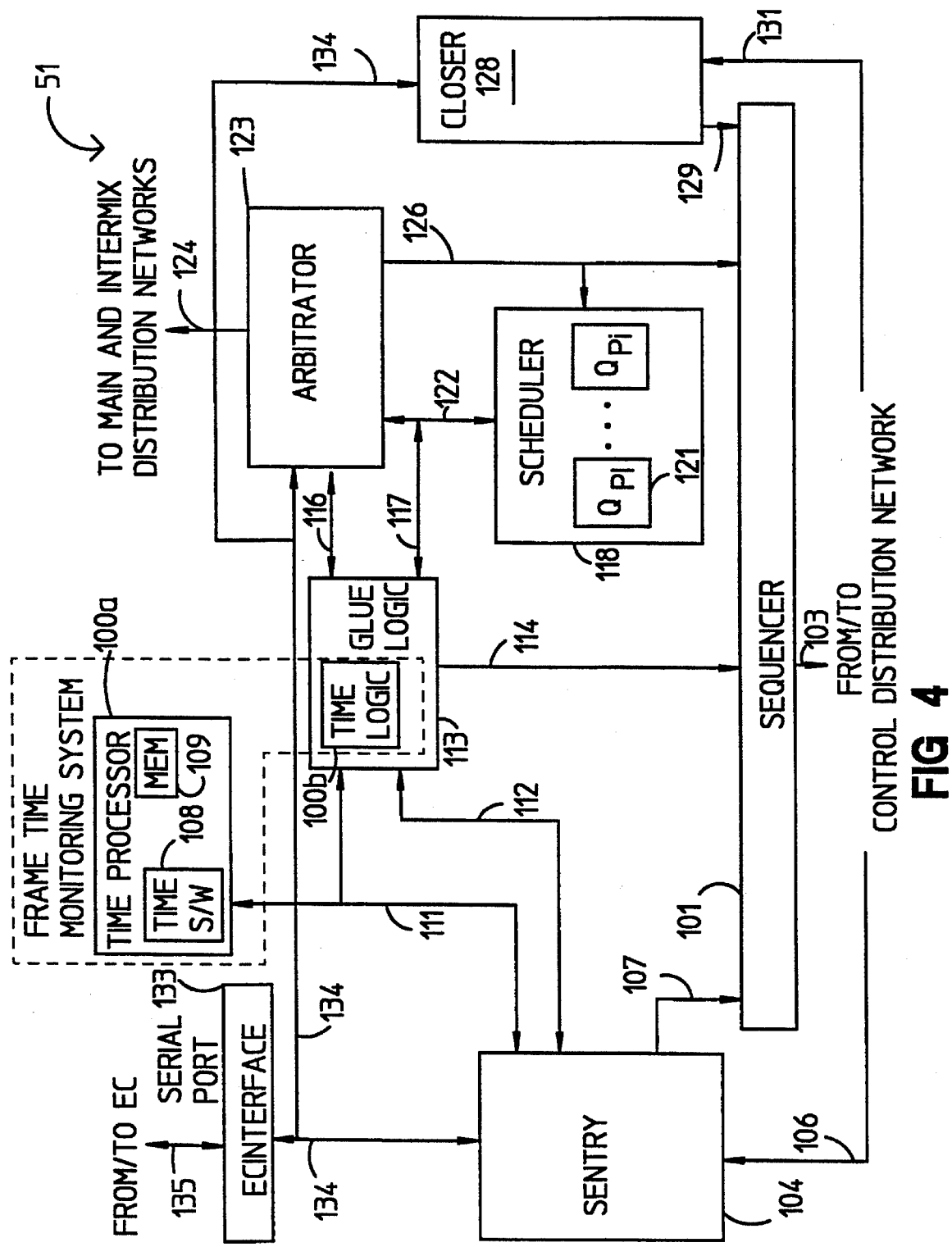
FIG. 4 is a schematic circuit diagram of a novel path allocation system within the fiber optic switch of FIG. 2.

A preferred embodiment of the novel path allocation system 50 of FIG. 2 is illustrated in detail in FIG. 4. As mentioned, the path allocation system 50 allocates the data paths through the switch module 36 with high performance. In architecture, the preferred embodiment of the path allocation system 50 has the following elements, as is illustrated in FIG. 4. A sequencer 101 is connected to the CDN 43 via a control connection 103. A sentry 104 communicates to the CDN 43 via the control connection 106 and is connected to the sequencer 101 via the control connection 107. A timer 108 communicates to the sentry 104 and glue logic 113 via a control connection 111. The glue logic 113 communicates control signals with the sentry 104 via the control connection 112, and communicates control signals to the sequencer 101 via the control connection 114. The scheduler 118 maintains a plurality of destination queues ($Q_{p1}$–$Q_{pi}$) 121 which correspond respectively with each of the ports (p1–pi) 33. The scheduler 118 communicates with the glue logic 113 via connections 117, 122. An arbitrator 123 is connected to the scheduler 118 via the connection 122, is connected to the glue logic 113 via the connection 116, is connected to the sequencer 101 via the connection 126, and communicates to the MDN 42 and IDN 44 via the data connection 124. A closer 128 monitors the sequencer 101 via the connection 129, receives control signals from the CDN 43 via the control connection 131, and communicates to the sentry 104, the arbitrator 123, and an element controller (EC) interface 133 via the connection 134. The EC interface 133 communicates via a serial connection 135 with the element controller 58 (FIG. 2).

In addition to the control and data connections described in the previous paragraph, the status MUX 41 of FIG. 2 is connected to and communicates status signals to the sentry 104, the glue logic 113, the arbitrator 123, and the closer 128. However, the foregoing connections are not shown in FIG. 4 for simplicity.

The sequencer 101 can be implemented with any suitable logic, for example, as a state machine(s) in a conventional field programmable gate array (FPGA) with the functionality as set forth hereafter. The sequencer 101 serves as the primary interface to the CDN 43 via the control connection 103. It essentially arbitrates the CDN 43 among the sentry 104, the arbitrator 123, and the closer 128.

The sentry 104 can be constructed with any suitable logic; for example, as a state machine(s) in an FPGA. It monitors the new frame status ("new frame arrived" signal) of the ports 33 via the status MUX 41 (FIG. 2) and status/control logic 85 (FIG. 3) and determines when a new frame is available for routing through the MDN 42 of the switch module 36. In essence, the sentry 104 collects data of validated, buffered frames, maps the destination port identification (DID) from the header (FIG. 1) of an incoming frame to an appropriate port 33 via a routing table(s), determines the appropriateness of a new frame for a destination port 33 (i.e., whether the frame can be intermixed onto a class 1 stream), and determines whether a new frame is proper or in error.

The sentry 104 and timer 108, together, further provide queue command information to the scheduler 118, via the glue logic 113 and connections 112, 117, 122. The queue command information can include an add signal, a frame busy (fbsy) signal, and a delete (del) signal. The add signal is sent when a new frame is within the receive memory 84 of the memory interface system 72 and is ready to be routed through the fiber optic switch 30. When an add signal is sent from the sentry 104 to the scheduler 118; the following information is sent: the add command, the destination port (or queue), a link list tail pointer, a class indicator, the source port, source buffer number, and a link list head pointer.

The fbsy signal is sent when the new frame has resided in the receive memory 84 for a predetermined time period (fbsy time period) which is considered too lengthy for the system. The fbsy signal which is sent by the sentry 104 to the scheduler 118 generally includes same information as the add signal, as delineated previously.

The delete signal is sent when the frame has resided in the receive memory 84 for another predetermined time period (delete time period), which is longer than the fbsy time period, and which warrants deletion of the frame. A delete signal may also be issued for other error conditions. The delete signal which is sent by the sentry 104 to the scheduler 118 includes the following path data: (a) the delete command, (b) the source port, and (c) the source buffer number.

The timer 108 can be implemented with any conventional processing mechanism, for instance, a digital signal processor (DSP). The timer 108 measures the time in which a new frame resides within the receiver memory 84 of a channel module 32 and determines when an fbsy signal and when a delete signal should be asserted by the sentry 104. For this purpose, the timer 108 maintains internally an fbsy/del clock for tracking the fbsy time period and the delete time period for each new frame. The timer 108 receives an initiate (INIT) signal 111 from the sentry 104 on connection 111 for starting the fbsy/del clock when a new frame is ready to be transferred from a port 33, receives a timer clear (clr) signal from the arbitrator 123 via glue logic 113 and via connections 116, 111 for the purpose of clearing the fbsy/del clock, and outputs the fbsy signal and the delete signal to the sentry 104 via connection 111 after, respectively, an fbsy time period and a delete time period, provided that no timer clear signal has been received from the arbitrator 123. The timer clear signal essentially terminates the fbsy/del clock of the timer 108.

The glue logic 113 primarily serves as an interface among the sentry 104, the timer 108, the sequencer 101, the arbitrator 123, and the scheduler 118. In the preferred embodiment, the glue logic 113 is implemented as a state machine(s) via an FPGA or other suitable logic. The glue logic 113 also performs other functionality in the preferred embodiment. The glue logic 113 monitors transmission ready (txready) signals and intermix ready signals through the sequencer 101, which indicate when a port intelligence mechanism 73 is ready to receive a data frame. The glue logic 113 performs a circular sequence wherein it searches in sequence through those txready signals and intermix ready signals which are asserted, by masking out those which are deasserted, to determine the next destination port 33 which is to receive data (as well as the next destination queue 121 to service). The glue logic 113 forwards the identity of the next destination port 33 to be serviced to the scheduler 118 via connections 117, 122. In this regard, the glue logic 113 forwards a word to the scheduler 118 comprising a base pointer address, which identifies the heads of double link list queues, and a destination queue indicator, which identifies a particular destination queue.

The scheduler 118, which can be implemented with any convention processing mechanism, such as a DSP, maintains and manages the destination queues ($Q_{p1}$–$Q_{pi}$) 121 and receives the queue management commands, particularly, an add signal, a fbsy signal, and a delete signal, from the sentry 104. The scheduler 118 also receives a next destination port signal via connections 117, 122, from the glue logic 113. The next destination port signal indicates the next port 33 to service (and hence, the next destination queue 121 to service).

The scheduler 118 maintains and updates a destination queue ($Q_{p1}$–$Q_{pi}$) 121 for each of the fiber optic ports (p1–pi) 33 and is configured to store queue entries associated with each corresponding port 33. Each queue entry has path data which identifies the following: (a) source port 33 from which data is to be transferred from, (b) the source buffer number in receive memory 84 where the frame is located, and (c) flags which indicate whether the queue entry is a normal frame entry, a frame for starting a class 1 data transfer ("SOFc1") entry, a Q-Head entry, or a Q-tail entry. Each of the queue entries is related by a link list, preferably a double or multiple link list, wherein each queue entry is associated with a backward link for designating a previous queue entry (via previous source port and buffer number) and a forward link for designating a subsequent queue entry (via next source port and buffer number). The double link lists provide an easy way to construct and manipulate queues, while minimizing hardware requirements.

When the scheduler 118 receives path data pertaining to a new frame from a port intelligence mechanism 73 via an add signal from the sentry 104, the scheduler 118 stores the path data in an appropriate destination queue 121, along with a forward and backward link.

When the scheduler 118 writes out data from the queues 121, it does so in an order defined by the glue logic 113. Moreover, when the scheduler 118 writes out path data from a particular destination queue 121, the scheduler 118 retrieves the queue entries from the destination queue 121 in an order defined by the link list associated therewith and then sends a request to transfer the new frame between the source port 33 and the destination port 33 to the arbitrator 123, which in turn causes the switch module 36 to interconnect the appropriate data path via the MDN 42 if the involved ports are ready.

When the scheduler 118 receives an fbsy signal corresponding to a frame from the sentry 104, the scheduler 118 takes the queue entry associated with the fbsy signal and moves the queue entry to the destination queue 121 corresponding to the source port 33 where the data frame originated, so that the data frame is eventually returned to the port 33 from which it came.

When the scheduler 118 receives a delete signal corresponding to a frame, the scheduler 118 will delete the queue entry associated with the frame. Note that the frame which is deleted was previously put into the queue corresponding to the source port 33 where the frame originated by virtue of the fbsy signal from the sentry 104.

The arbitrator 123 is implemented with any suitable logic, preferably a state machine(s) implemented with an FPGA. The arbitrator 123 tracks the status of the port intelligence mechanisms 73, determines when the port intelligence mechanisms 73 are available and unavailable for transmitting and receiving data, and arbitrates connections between the port intelligence mechanisms 73. Specifically, the arbitrator 123 monitors transmission ready (txready), intermix ready, intermix bus ready, and receive ready (rxready) signals generated by the status/control logic 85 (FIG. 3) of the port intelligence mechanisms 73. When the arbitrator 123 receives a transfer request signal from the scheduler 118 to transfer data from a particular source port 33 to a particular destination port 33, the arbitrator 123 determines whether the transfer is either class 1 (circuit switching) or class 2 (frame switching).

If a class 1 transfer is to be effectuated, then the arbitrator 123 determines if both the particular source port 33 and the destination port 33 are available for both transmitting and receiving data, because a class 1 transfer is bidirectional and requires a reserved data path through the switch 30. If a class 2 transfer is to be effectuated, then the arbitrator 123 determines whether the particular source port 33 is ready to transfer and whether the particular destination port 33 is available for receiving a data frame.

When the ports 33 are not ready to make the transfer (either in class 1 or class 2), then the arbitrator 123 refuses the scheduler's transfer request, and the scheduler 118 revisits the transfer request later using any suitable algorithm, until the transfer request is ultimately granted. Once a transfer request has been granted by the arbitrator 123, the arbitrator 123 controls the MDN 42 (FIG. 2) so that the MDN 42 connects the appropriate source port 33 to the appropriate destination port 33. Moreover, after or when the data transfer has been authorized by the arbitrator, the arbitrator 123 forwards a scheduler clear signal to the scheduler 118 so that the scheduler 118 eliminates the associated queue entry from the corresponding link list queue. The arbitrator 123 also forwards a timer clear signal to the timer 108 in order to clear the timer's internal fbsy/del clock for the data frame being transferred.

The closer 128 is implemented with any suitable logic, preferably a state machine(s) implemented with a commercially available FPGA. The closer 128 monitors the transfer status ready signals (xfer ready; indicates when status information is ready and not ready to be transferred) corresponding with the ports 33 via connection 131 to the CDN 43. The closer 128 interfaces with the sequencer 101 in order to execute CDN switch commands and to execute destination port commands for a collection of status information. The closer 128 further collects frame statistics and delivers an increment count command to the EC interface 133. The statistics and increment count can be used by high level optimization algorithms to optimize network performance and network management.

The EC interface 133 is implemented with any conventional processing mechanism, such as a DSP. It interfaces the path allocation system 50 to the element controller 58 (FIG. 2) via a serial connection 135. The EC interface 133 accepts commands from the element controller 58, builds packets from the commands, maintains and accesses the path allocation system's memory to execute read or write commands from the element controller 58, sends commands to the sentry 104 in order to change address validation table information, and sends commands to the timer 108 through the dedicated serial port 135.

OPERATION

The overall operation of the fiber optic switch 30 with the novel path allocation system 50 will now be described with reference to FIGS. 1 through 4 and, particularly, to a class 2 data transfer where a new data frame is routed through the fiber optic switch 30 and to a class 1 data transfer where a bidirectional reserved data path is established between ports 33.

Initially, a data frame is forwarded to the receive memory 84 of a channel module 32 from a source port (p1–pi) 33. The status/control logic 85 associated with the source port 33 outputs an rxready signal to the status MUX 41, which forwards the rxready signal to the sentry 104. Based upon the rxready signal, the sentry 104 recognizes that a new frame is available and asks the sequencer 101 to request path data from the status/control logic 85 associated with the source port 33 from which the new frame was received. The path data includes a source identification (SID), a buffer number indicating the location of the frame in receive memory 84, a destination port identification (DID), and a class indicator (class 1 or 2).

In this regard, the sequencer 101 communicates a sequence of control commands to the CDN 43 in order to set up the CDN for causing the status/control logic 85 associated with the source port 33 to forward the path data corresponding to the new frame. The CDN 43 then causes the path data for the new frame to be transferred from the status/control logic 85 to the sentry 104. The sentry 104 validates the SID and maps the DID to a specific destination port 33. If either the DID or SID is invalid, a reject frame signal is queued in the status/control logic 85 instead of the frame itself.

The sentry 104 informs both the timer 108 and the scheduler 118 of the presence of the new frame. The timer initiates the fbsy/del clock. Moreover, the sentry 104 sends an add signal to the scheduler 118. The scheduler 118 determines which destination queue to utilize based on the destination port indicator associated with the add signal from the sentry 104. A tail base pointer address in the add signal is utilized for accessing the tail of the particular destination queue, which is where the path data corresponding to the new frame is added. The scheduler 118 uses the source port indicator, the source buffer number (in a receive memory 84), and class indicator to generate a queue entry in the particular destination queue, which is placed at the tail of the particular destination queue 121.

In the event that the fbsy time period expires at the timer 108 before the timer 108 receives the timer clear signal from the arbitrator 123, the timer 108 will forward an fbsy signal to the sentry 104, which in turn will send an fbsy signal to the scheduler 118. At this point, the scheduler 118 takes the queue entry associated with the fbsy signal and moves the queue entry to the queue corresponding to the source port 33 where the data originated, so that the data is eventually returned to the source port 33 from which it came.

If the predetermined delete time period expires at the timer 108 prior to the time that the timer 108 receives the timer clear signal from the arbitrator 123, then the timer 108 will forward a delete signal to the glue logic 113, which in turn will forward a delete signal to the scheduler 118. At this point, the scheduler 118 will delete the queue entry associated with the expired delete time period (which was previously put in the queue 121 corresponding to the source port 33 of origination).

As queue entries are introduced into the queues 121 by the scheduler 118, the scheduler 118 is also concurrently routing transfer requests to the arbitrator 123 for particular data connections and destination ports 33. The scheduler 118 receives a next destination port signal from the glue logic 113, and accordingly, the scheduler 118 retrieves the queue entry at the head of the queue corresponding to the next destination port 33. The scheduler 118 then sends a transfer request to the arbitrator 123 corresponding to the retrieved queue entry.

The arbitrator 123 continuously monitors the status signals (e.g., rxready, intermix ready, intermix bus ready, txready) from the source and destination port intelligence mechanisms 73 and determines whether the particular source and destination ports 33 are ready to exchange data. The arbitrator 123 determines whether the transfer is either class 1 or class 2. If class 1, then the arbitrator 123 determines if both the particular source port 33 and the destination port 33 are available for both transmitting and receiving data, because a class 1 transfer requires a reserved path. If class 2, then the arbitrator 123 determines whether the particular source port 33 is ready to transfer (i.e., rxready for source port 33 is asserted) and whether the particular destination port 33 is available for receiving the new frame (i.e., txready for the destination port 33 is asserted).

When the ports 33 are not ready to make the transfer (either class 1 or class 2), then the arbitrator 123 refuses the scheduler's transfer request, and the scheduler 118 revisits the transfer request later, until the transfer request is ultimately granted.

Once a class 1 transfer request has been granted by the arbitrator 123, the arbitrator 123 configures the MDN 42 or the IDN 44 so that the MDN 42 or the IDN 44 reserves a data path and connects the appropriate source port 33 to the appropriate destination port 33. Moreover, once a class 2 transfer request has been granted by the arbitrator 123, the arbitrator 123 configures the MDN 42 or the IDN 44 so that the new data frame is channeled from the receive memory 84 associated with the source port 33 to the appropriate destination port 33.

Upon the granting of either a class 1 or class 2 data transfer, the sequencer 101 informs the particular status/control mechanism 85 corresponding to the destination port 33 to expect data so that the mechanism 85 can set up accordingly. The arbitrator 123 also forwards a scheduler clear signal to the scheduler 118 so that the scheduler 118 eliminates the associated queue entry from the corresponding destination queue, and also forwards a timer clear signal to the timer 108 to clear the timer's internal fbsy/del clock corresponding to the frame. Moreover, after the timer 108 clears its clock, the timer 108 forwards a control signal to the status/control logic 85 associated with the source port 33 to ultimately cause the receive memory 84 to forward the new frame (or perhaps a frame rejection signal) to the switch module 36 and then the destination port 33.

The closer 128 finishes the frame transfer by insuring that the transfer has occurred and by collecting the statistics on the transfer. The closer 128 requests the transfer status through the sequencer 101 regarding the transfer of the frame through the sequencer 101. In turn, the destination port intelligence mechanism 73 advises the closer 128 of the status. The status information can include at least the following: CRC error, null frame, fbsy, reject frame (bad SID or DID), SOFc1, intermix, and source port number. The closer 128 then instructs the EC interface 133 to increment a count, and the EC interface 133 increments the appropriate count.

It will be obvious Go those skilled in the art that many variations and modifications may be made to the preferred embodiment of the path allocation system 50 and associated methodology as well as the fiber optic switch 30 without substantially departing from the principles of the present invention. All such variations and modifications are intended to be included herein within the scope of the present invention, as set forth in the following claims.

Wherefore, the following is claimed:

1. A path allocation system for high performance data transfer through a fiber optic switch which selectively interconnects fiber optic channels in a fiber optic network, comprising:

a plurality of bidirectional ports corresponding respectively with said channels;

a memory means associated with said ports, said memory means for temporarily storing an incoming new data frame from a source port;

a distribution network configured to interconnect said ports;

a sentry in communication with said memory means, said sentry configured to determine when said new data frame has been received by said memory means;

a scheduler which maintains a destination queue corresponding with each of said ports, said scheduler configured to receive path data pertaining to said new data frame from said sentry after said sentry determines receipt of said new data frame, said path data including a source port indicator, a memory address identifying a location of said frame in said memory means, and a destination port indicator mapped by said sentry, and said scheduler configured to place said path data within the destination queue corresponding with said destination port and to retrieve said path data from said destination queue based upon an order defined by said queue; and an arbitrator configured to control said distribution network and in communication with said scheduler and said ports, said arbitrator configured to determine, after said arbitrator receives a frame transfer request from said scheduler, when said destination port is busy servicing another frame transfer request and when said destination port is available for accommodating said frame transfer request, and said arbitrator configured to allow communication of said new data frame to said destination port via said distribution network when said destination port is available and to disallow said frame transfer request when said destination port is busy.

2. The system of claim 1, further comprising a timer controlled by said sentry, said timer for tracking time associated with said new data frame, said timer being initiated by said sentry when said new data frame is determined to exist within said memory means and being cleared by said arbitrator when said data transfer request corresponding to said new data frame is allowed, said timer for communicating a frame busy signal to said scheduler after a predetermined frame busy time period unless a clear signal is received from said arbitrator, said scheduler being configured to move said transfer request from said destination queue to another destination queue corresponding to said source port so that said new data frame is destined to return to said source port upon receipt of said frame busy signal.

3. The system of claim 2, wherein said timer generates and communicates a delete signal to said scheduler after a predetermined delete time period unless said clear signal is received from said arbitrator, said delete time period being longer than said frame busy time period, said scheduler being configured to delete said transfer request from said another destination port upon receipt of said delete signal.

4. The system of claim 1, further comprising:
   a transmitter and a receiver associated with each of said ports;
   a port intelligence means associated with each of said ports, each said port intelligence means for indicating when said transmitter and said receiver are busy and available;
   glue logic in communication with said scheduler and each said port intelligence means, said glue logic configured to determine which of said port intelligence means are available to receive data, said glue logic configured to select a next destination port to be serviced from said available ports, said glue logic configured to notify said scheduler of said next destination port; and
   wherein said scheduler retrieves said path data from a respective destination queue corresponding to said next destination port.

5. The system of claim 1, wherein said arbitrator further comprises a means for determining whether said transfer request is directed to establishing one of a frame transfer or a circuit switching transfer and wherein said arbitrator determines the availability of both said source and destination ports for both receiving and transmitting data.

6. A path allocation method for high performance data transfer through a fiber optic switch which selectively interconnects fiber optic ports, comprising the steps of:
   maintaining a destination queue for each of said ports for queuing transfers through said switch from a source port to a destination port;
   storing a new data frame in said switch which is received from a source port and which is to be routed to a destination port;
   placing path data indicating a location of said new data frame within a destination queue corresponding with said destination port;
   retrieving said path data from said destination queue based upon an order defined by said queue;
   after said path data is retrieved from said destination queue, determining if said destination port is busy servicing another frame transfer request or if said destination port is available for accommodating a frame transfer;
   communicating said new data frame to said destination port when said destination port is available; and
   disallowing said frame transfer request when said destination port is busy.

7. The method of claim 6, further comprising the steps of:
   tracking elapsed time after said new data frame is received;
   clearing said elapsed time when said new data frame is communicated to said destination port; and
   after a predetermined elapsed time, moving said transfer request from said destination queue to another destination queue corresponding to said source port so that said new data frame is destined to return to said source port.

8. The method of claim 7, further comprising the step of, after a second predetermined elapsed time, deleting said transfer request from said another destination queue unless a clear signal is received.

9. The method of claim 6, further comprising the steps of:
   determining whether said transfer request is directed to establishing one of a frame transfer and a circuit switching transfer; and
   determining the availability of both said source and destination ports for both receiving and transmitting data.

10. The method of claim 6, further comprising the steps of:
   determining which of said ports are available to receive data;
   selecting a next destination port based upon which of said ports are available; and
   retrieving said path data from said destination queue when said destination queue corresponds with said next destination port.

\* \* \* \* \*